W. J. PARSONS & J. A. LELAND.
DRILL BRACE.
APPLICATION FILED MAY 7, 1909.
942,586.
Patented Dec. 7, 1909.
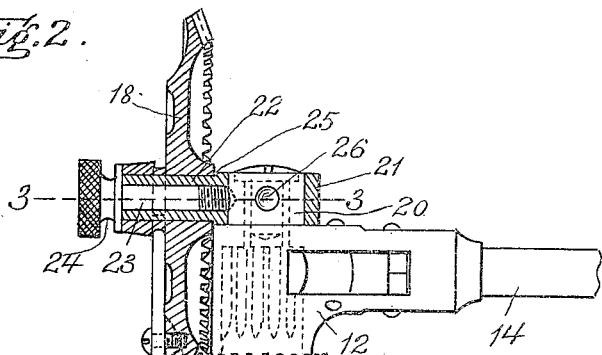
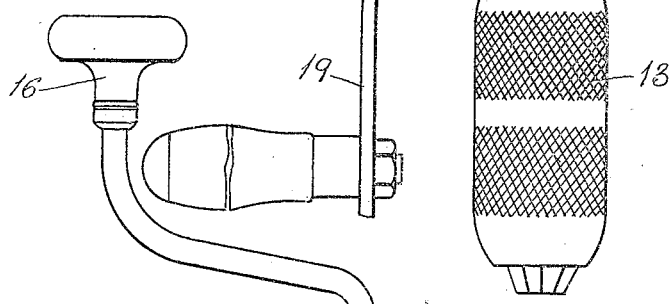
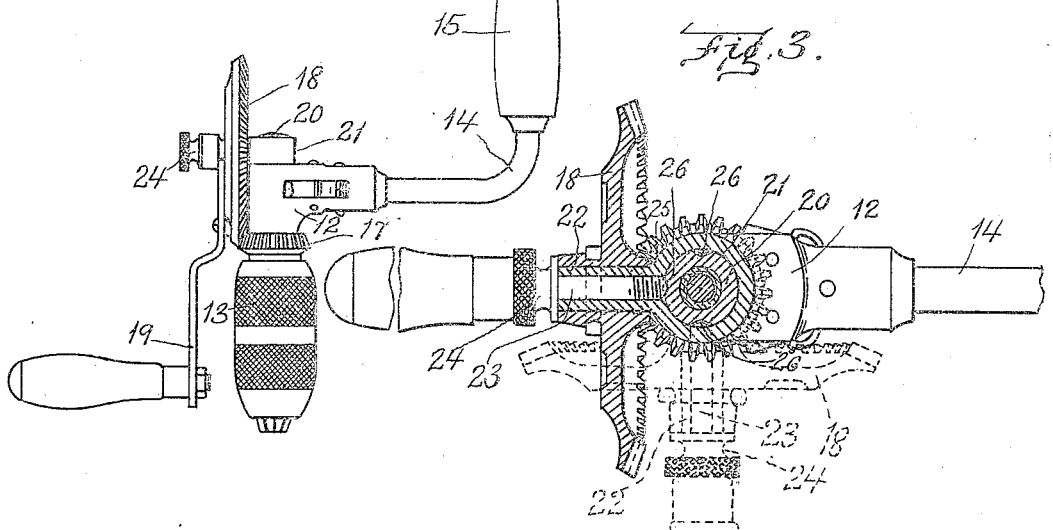
Witnesses
P. W. Pezzetti
E. Batchelder
Inventors
W. J. Parsons
J. A. Leland
by Wright Brown Quinby May
attys

UNITED STATES PATENT OFFICE.

WILLIAM J. PARSONS AND JOHN A. LELAND, OF MONTAGUE, MASSACHUSETTS, ASSIGNORS TO MILLERS FALLS COMPANY, OF MILLERS FALLS, MASSACHUSETTS, A CORPORATION OF MASSACHUSETTS.

DRILL-BRACE.

942,586.

Specification of Letters Patent.

Patented Dec. 7, 1909.

Application filed May 7, 1909. Serial No. 494,658.

*To all whom it may concern:*

Be it known that we, WILLIAM J. PARSONS and JOHN A. LELAND, both of Montague, in the county of Franklin and State of Massachusetts, have invented certain new and useful Improvements in Drill-Braces, of which the following is a specification.

This invention relates to a brace or stock having the ordinary general form of a bit brace, and provided with a socket or chuck adapted to hold a drill or equivalent tool, and rotatable independently of the brace, and with multiplying gear mechanism whereby the socket or chuck may be rotated by one hand of the operator at a relatively rapid rate.

The invention has for its object to enable the driving member of the multiplying gear mechanism to be located in different positions relatively to the brace body to suit the exigencies of different kinds of work, and enable the operator to so locate the said driving member and its operating crank as to make the operation of the operating mechanism convenient under different circumstances.

The invention consists in a drill brace comprising a brace body, a chuck or socket rotatably connected therewith, a bevel gear affixed to the chuck, a driving bevel gear meshing with the chuck gear, and means for securing the driving gear in different positions relatively to the chuck body.

The invention also consists in certain details of mechanism incidental to the general purposes of the invention.

Of the accompanying drawings forming a part of this specification,—Figure 1 represents a side elevation of a drill brace embodying our invention. Fig. 2 represents an enlargement of a portion of Fig. 1, showing in section the driving member of the multiplying gear mechanism and the preferred means for securing said member in different positions relatively to the brace body. Fig. 3 represents a section on line 3—3 of Fig. 2.

The same reference characters indicate the same parts in all the figures.

In the drawings,—12 represents the portion of a brace or stock which has the bearing for the socket or chuck 13, the stock including the usual crank arm 14 having a handle 15, and a head or rest 16. The socket or chuck 13, which may be of any suitable construction, is rotatable independently of the brace body, and is provided with a bevel gear 17 which is rigidly attached to the chuck and forms the driven member of the multiplying gear mechanism.

18 represents a larger bevel gear which meshes with the chuck gear 17 and forms the driving member of the multiplying gear mechanism, said gear being provided with an operating crank 19. The driving gear 18 is connected with the portion 12 of the brace body by means embodying our invention, said means enabling the driving gear to be secured in different positions relatively to the brace body crank 14, so that the operating crank 19 may be located to operate in any one of a plurality of planes relatively to the body crank 14 which the convenience of the operator may require in avoiding obstructions to the free rotation of the driving gear.

In the preferred embodiment of our invention here shown, the portion 12 of the brace body is provided with a circular boss 20 which is in alinement with the axis of the chuck, and is rigidly secured to or forms an integral part of the portion 12.

21 represents a sleeve which has a snug movable fit on the boss 20 and is provided with a tubular stud 22 extending substantially at a right angle with the axis of the chuck and constituting the bearing upon which the driving gear 18 is journaled, the bore of the tubular stud being provided with an internal screw thread.

23 represents a set screw, the inner end portion of which is threaded to engage the internal thread of the stud 22, the head 24 of the set screw being formed to bear on the outer end of the hub of the driving gear 18. The sleeve 21 is provided with a shoulder 25 which bears on the inner end of the hub of the driving gear, said hub being adapted to rotate freely on the stud 22 between the head 24 and shoulder 25. The inner end of the set screw engages the perimeter of the boss 20, said inner end being preferably of conical form and the boss being preferably provided with a series of sockets 26, each of which is adapted to engage the inner end of the set screw. Said sockets, as here shown, are three in number and are located at different portions of the periphery of the boss.

It will be seen that when the set screw is turned home with its inner end coinciding with one of the sockets 26, a positive engagement is effected between the stud 22 and the boss 20, and that by changing the engagement of the set screw from one socket 26 to another, the position of the driving gear 18 relatively to the brace body may be varied as illustrated in Fig. 3, where the stud and the driving gear thereon are shown by full lines in one position and by dotted lines in a different position. The operator is therefore enabled to locate the driving gear and its crank in either of a plurality of positions to suit the requirements of the work on which he is engaged, and avoid obstruction to the free rotation of the operating crank.

We claim:

1. A drill brace comprising a brace body, a chuck rotatively connected therewith, said body including a U-shaped portion forming a crank, a bevel gear affixed to the chuck, a driving bevel gear meshing with the chuck gear, and means for securing the driving gear in different positions relatively to the chuck body.

2. A drill brace comprising a brace body, a chuck rotatively connected therewith, said body including a U-shaped portion forming a crank, a bevel gear affixed to the chuck, a stud pivotally connected to the body, a driving bevel gear journaled on said stud and meshing with the chuck gear, the axis on which the stud is adapted to swing being in alinement with the axis of the chuck and its gear, whereby the stud is adapted to be adjusted to locate the driving gear in different positions relatively to the brace body, and means for positively securing the stud to the body in different positions.

3. A drill brace comprising a brace body, a chuck rotatively connected therewith, said body including a U-shaped portion forming a crank, the body being provided with a fixed circular boss in alinement with the axis of the chuck, a sleeve fitted to turn on said boss and having a hollow internally threaded stud, projecting at an angle to the axis of the chuck, a bevel gear attached to the chuck, a driving bevel gear journaled on the stud and meshing with the chuck gear, and a set screw which engages the internal thread of the stud and the perimeter of the boss, and is adapted to adjustably secure the stud to the boss in different positions.

4. In a drill brace, the combination with the body having a rest and chuck in alinement and having an intermediate crank, of multiplying gearing for the chuck; said gearing being mounted below the crank to enable the device to be operated by the crank without interference by said gearing, and means for adjusting said gearing to different positions about the axis of the chuck bearing.

In testimony whereof we have affixed our signatures, in presence of two witnesses.

WILLIAM J. PARSONS.
JOHN A. LELAND.

Witnesses:
LIZZIE STRACHAN,
K. E. NICHOLS.